United States Patent
Spitler et al.

(12) 
(10) Patent No.: US 6,642,341 B1
(45) Date of Patent: Nov. 4, 2003

(54) MOLDED ARTICLES HAVING IMPROVED FLEX MODULUS AND IMPACT STRENGTH AND A PROCESS FOR THE PRODUCTION THEREOF

(75) Inventors: Kieth G. Spitler, Burgettstown, PA (US); Allison E. Yeske, Pittsburgh, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 10/152,417

(22) Filed: May 21, 2002

(51) Int. Cl.[7] ............................................... C08G 18/08
(52) U.S. Cl. ........................ 528/44; 264/435; 264/436; 264/484
(58) Field of Search ................................ 264/435, 436, 264/484; 528/44

(56) References Cited

U.S. PATENT DOCUMENTS

| | | | |
|---|---|---|---|
| 3,324,026 A | 6/1967 | Waterman et al. | 204/302 |
| 3,668,096 A | 6/1972 | Cook | 204/165 |
| 3,936,412 A | 2/1976 | Rocholl | 260/37 R |
| 4,423,191 A | 12/1983 | Haven et al. | 525/169 |
| 4,482,582 A | 11/1984 | Weisman | 427/185 |
| 5,277,737 A | 1/1994 | Li et al. | 156/274.8 |
| 5,484,550 A | 1/1996 | Warner | 252/299.01 |

OTHER PUBLICATIONS

Science, vol. 273, pp. 931–933, Aug. 16, 1996, T.L. Morkved, M.Lu, A.M. Urbas, E.E. Ehrichs., H.M. Jaeger, P. Manskey and T.P. Russell, "Local Control of Microdomain Orientation in Diblock Copolymer Thin Films with Electric Fields".

Science, vol. 272, pp. 252–255, Apr. 12, 1996, Hilmar Körner, Atsushi Shiota, Timothy J. Bunning., Christopher K. Ober, "Orientation–On–Demand Thin Films: Curing of Liquid Crystalline Networks in ac Electric Fields".

*Primary Examiner*—Rachel Gorr
(74) *Attorney, Agent, or Firm*—Joseph C. Gil; Lyndanne M. Whalen

(57) ABSTRACT

Molded polyurethane articles having improved flex modulus and impact strength are produced by subjecting a polyurethane-forming reaction mixture which has been introduced into a mold to a static electric field. The static electric field must have a field strength which is less than the dielectric strength of the polyurethane being produced but sufficiently strong to align the hard segment dipoles of the polyurethane.

7 Claims, 3 Drawing Sheets

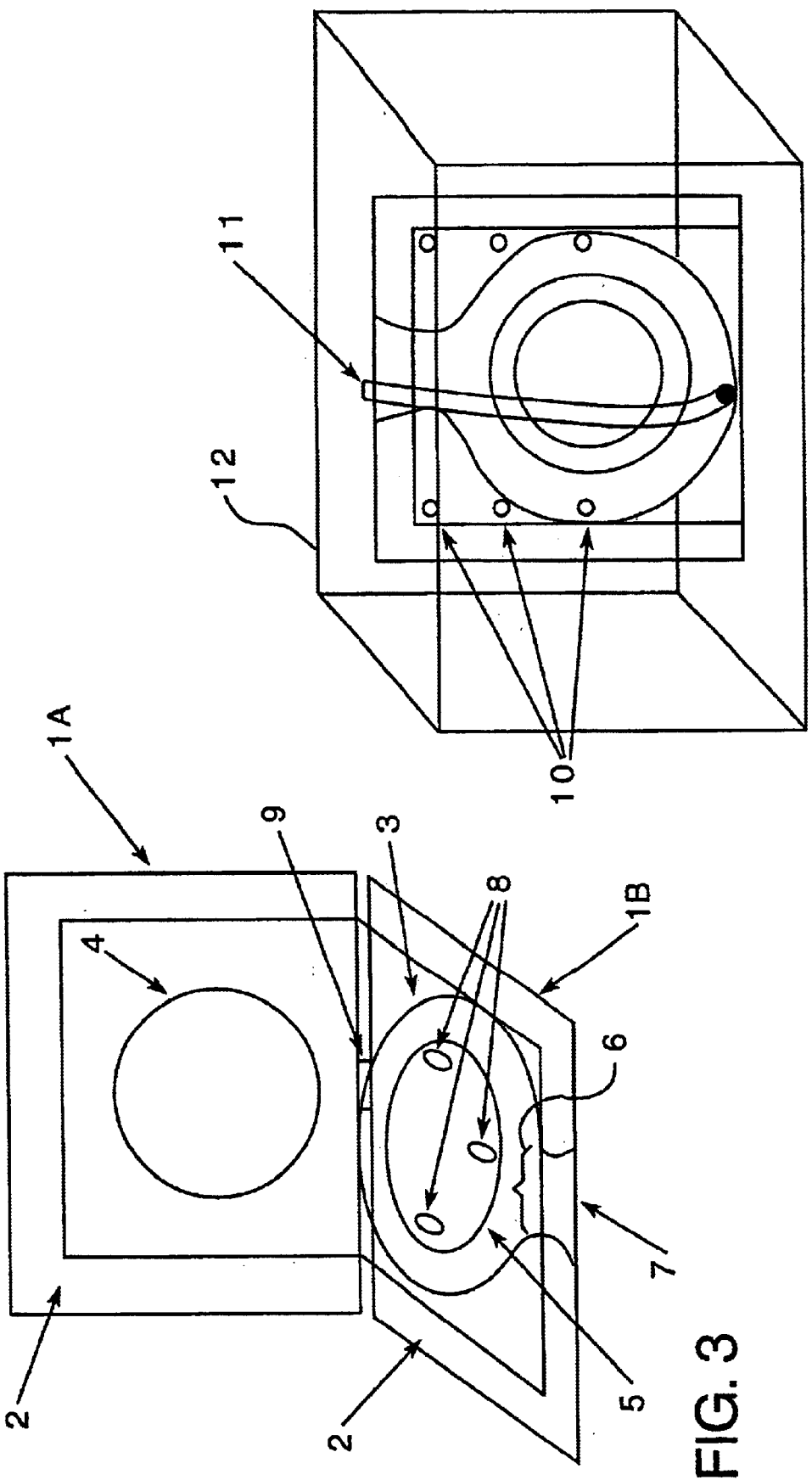

MOLDED ARTICLES HAVING IMPROVED FLEX MODULUS AND IMPACT STRENGTH AND A PROCESS FOR THE PRODUCTION THEREOF

BACKGROUND OF THE INVENTION

The present invention relates to molded articles having improved flex modulus and impact strength which are produced from a polyurethane material and to a process for the production thereof. The process of the present invention is particularly useful for molding polyurethane elastomers.

In polymeric materials such as polyurethanes, the carbon, nitrogen and oxygen atoms found in the polyurethane linkages are held together by covalent bonds, which result from a sharing of electrons. In this case however, the nuclei do not share the electrons equally, and the electron cloud is denser around certain atoms. The result is that one end of the covalent bond is relatively electron rich (a negative pole) and the other end relatively electron poor (a positive pole). Thus, polyurethane molecules are polar, and the urethane linkage contains a dipole having two equal and opposite charges separated in space. It is therefore theoretically possible that in the presence of a static electric field, the uneven charge distribution in urethane hard segments could make dipole alignment possible.

The general concept of applying an electric field to achieve dipole alignment of selected materials has been disclosed in the prior art. For example, scientists at the University of Chicago and IBM have cooperatively studied the effects of static electric fields on thin films of asymmetric polystyrene-polymethylmethacrylate (PS-PMMA) diblock copolymers. By applying electric fields of approximately 40 kV/cm for 24 hours at elevated temperatures in an inert atmosphere, they were able to achieve alignment of the PMMA microdomain parallel to the electric field. This alignment was locked in by cooling the sample at a rate of 0.5° C./min to room temperature and observed using transmission electron microscopy. T. L. Morkved et al, "Local Control of Microdomain Orientation in Diblock Copolymer Thin Films with Electric Fields", *Science*, Vol. 273, p. 931–933 (Aug. 16, 1996).

Researchers at Cornell University and at Wright Patterson Air Force Base have experimented with alternating electric fields. Using electric field strengths of 10 kV/cm, they observed orientation in cyclic siloxane molecules. Sophisticated synchrotron X-ray equipment enabled them to observe molecular orientation in real time. H. Korner, et al, "Orientation-On-Demand Thin Films: Curing of Liquid Crystalline Networks in ac Electric Fields" *Science*, Vol. 272, p. 252–255 (April 12, 1996).

Electric fields are being used in a variety of other applications. Dielectric heating and embossing (U.S. Pat. Nos. 4,482,582; 3,936,412; and 4,423,191), dielectric curing of adhesives (U.S. Pat. No. 5,277,737), monitoring the extent of cure of polymers, filtering to remove contaminants (U.S. Pat. No. 3,324,026), initiation of polymerization reactions (U.S. Pat. No. 3,668,096), and alignment of dipoles in non-linear optical materials (U.S. Pat. No. 5,484,550) are a few examples.

When used to monitor the extent of cure of a polymer, the plate current between two electrodes is measured throughout the reaction. As the material cures, its dielectric loss decreases, thereby decreasing the current between the electrodes.

U.S. Pat. No. 4,482,582 describes a method for altering the dielectric character of polyurethane ("PU") foam to make it more responsive to dielectric heating techniques by pre-treatment with an additive such as polyvinylchloride. U.S. Pat. Nos. 3,936,412 and 4,423,191 disclose post-impregnation with a vinyl plastic or resin or the addition of electrically non-conductive pigments and/or fillers with large dielectric constants to alter the dielectric character of the foam.

SUMMARY OF THE INVENTION

It is an object of the present invention to provide a process for producing molded articles having both improved flex modulus and impact strength from polyurethane materials.

It is another object of the present invention to provide molded articles having both improved flex modulus and impact strength.

It is a further object of the present invention to provide molded articles having improved flex modulus and impact strength which need not be treated after demolding.

These and other objects which will be apparent to those skilled in the art are accomplished by subjecting a polyurethane-forming reaction mixture which has been introduced into a mold to a static electric field having a field strength which is less than the dieletric strength of the polyurethane being produced but sufficiently strong to align the hard segment dipoles of the polyurethane.

BRIEF DESCRIPTION OF THE DRAWINGS

FIG. 3 illustrates the mold used in Example 2 in the open position.

FIG. 4 illustrates the mold used in Example 2 in the closed position.

DETAILED DESCRIPTION OF THE PRESENT INVENTION

The present invention relates to a process for improving the physical and mechanical properties of molded articles produced from a polyurethane in which dipole alignment rather than chemical modification is used to achieve combinations of improved properties and to the molded articles produced by this process.

Any of the known polyurethanes may be successfully used in the process of the present invention because it is the dipole moment of the polyurethane rather than the use of a specific reactant or combination of materials which is important in the practice of the process of the present invention. All polyurethanes are characterized by a dipole moment.

Carbon, nitrogen and oxygen atoms in polymeric molecules are held together by covalent bonds, which result from a sharing of electrons. Often the two nuclei do not share the electrons equally, and the electron cloud is denser around certain atoms. Thus, one end of the covalent bond is relatively electron rich (a negative pole) and the other end is relatively electron poor (a positive pole), and the bond is therefore polar. A covalent bond can be expected to be polar if it joins atoms that differ in electronegativity (i.e., the tendency to attract electrons). The greater the difference in electronegativity, the more polar the bond will be. Bond dipoles are treated as vector quantities (with both magnitude and direction). If the vector sum of all of the bond dipoles in a molecule results in another vector, this resultant vector represents the overall molecular dipole.

A dipole is defined as two equal and opposite charges separated in space. Associated with a dipole is its dipole moment (p; units=Coulomb meter). Dipole moment is defined as the magnitude of the charge (q; units=Coulomb) multiplied by the distance (d; units=meter) between the charges. Dipole moments are a quantitative measure of the degree of charge separation in a molecule. For polyurethane molecules, there is roughly an order of magnitude difference between the dipole moments of the urethane hard segment and the polyol soft segment. The hard segment dipole moment is typically around 250 Debye and the soft segment is generally around 25 Debye.

It is possible for molecules to contain bond dipoles but have no overall molecular dipole if the bond dipole vectors are of the same magnitude but opposite direction. Addition of such equal dipole vectors having opposite directions results in cancellation. Molecules in which cancellation of dipole vectors occurs or in which no dipole moment is present are termed nonpolar. Materials made up of such nonpolar molecules are not suitable for use in the practice of the present invention.

Figure 1:
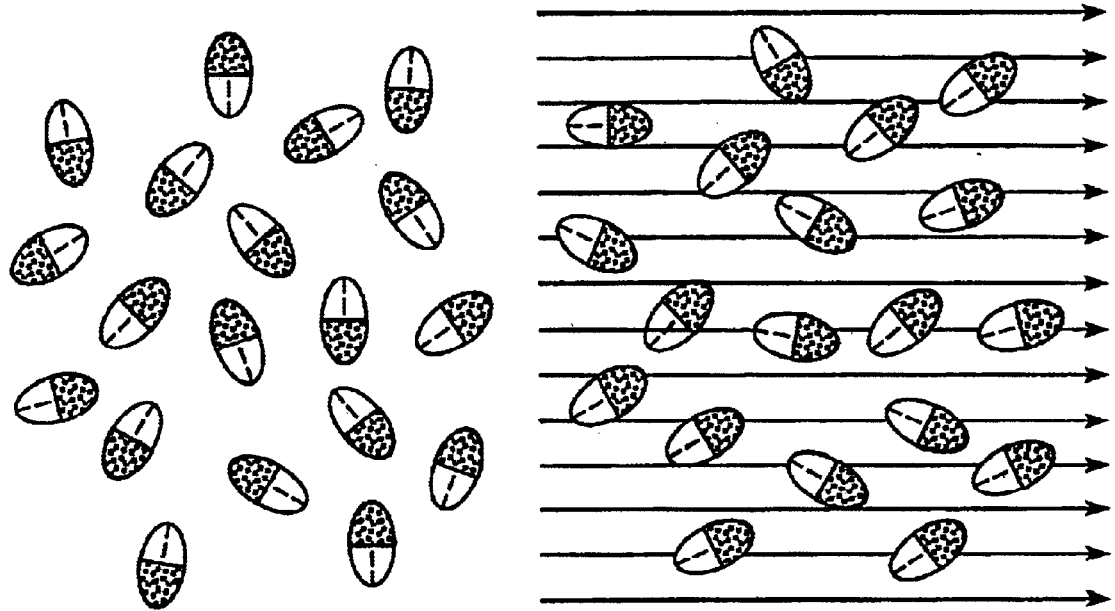
FIG. 1 illustrates the positioning of polar molecules before and after application of an electric field.

Under normal conditions, the dipoles in polar molecules exist in a random configuration. Upon application of a static electric field, the dipoles experience a torque which tends to align them in the direction of the applied electric field. (See FIG. 1.)

In small molecules, random thermal motion and conformation preferences compete with this torque, making complete alignment almost impossible. This competition is, however, much less of an issue with polymers such as the polyurethanes employed in the practice of the present invention. Due to their size, random thermal motion occurs at a much slower rate in polymers than in small molecules. Also, in the case of polymers which include hard segments such as urethane groups joined by soft segments such as polyethers, the soft segment linkages can easily rotate out of their steady state conformation, allowing portions of the molecule (e.g., the dipoles in the hard segments) to be influenced by the electric field.

The electric field employed in the process of the present invention to align the polymer segments must be strong enough to align the dipoles in the hard segment, but not so strong that it exceeds the dielectric strength of the polymer and begins to break down the polymeric (i.e., polyurethane) material which is being formed between the plates of the mold.

A suitable electric field strength will, of course, be dependent upon the particular materials being reacted and the specific polyurethane being produced. However, appropriate field strengths for any given reactants and polymer may readily be determined in the manner described in detail below.

A dipole has its smallest potential energy when it is aligned with the electric field. To change this potential energy, work must be done on the dipole. The equation for calculating the work (W) that must be done to rotate a dipole by 180° is $$W = 2pE \quad (1)$$

where
  p=dipole moment
  E=electric field strength
This work must exceed the average translational energy ($E_T$) of the molecule at a certain temperature. If it does not, the effects of random thermal motion will prevail and dipole alignment will not be possible. $E_T$ is calculated by:

$$E_T = \frac{3}{2}kT$$

where
  k=Boltzmann constant=1.38·10$^{-23}$ J/K (2)
  T=absolute temperature

Solving equation (2) and setting it less than or equal to equation (1) allows one to calculate the electric field strength. Assuming a temperature of 65° C., the electric field strength necessary to rotate the urethane dipoles is calculated to be approximately 40 kV/cm.

Two basic phenomena result from the interaction of charged particles with electric fields. Therefore, materials are classified into two different types, namely conductors and insulators (dielectrics). Conductors are characterized by the presence of many free electrons. Upon application of an external electric field, these free electrons, which are constantly in motion, experience a force. Initially the external field drives any free negative charges (electrons) to the positive plate and the remaining positive charges (relatively stationary protons) produce a net positive charge on the inside surface nearest to the negative plate. These induced charges produce a field inside the conductor which is the same in magnitude but opposite in direction to the external field. Therefore, the two fields cancel each other and the resultant field inside the conductor is zero. Any net charge resides on the surface of a conductor, however the net charge density (ρ) inside a conductor is zero. This is due to the fact that although there is charge present, an equal amount of positive and negative charge exists.

In contrast, dielectrics are basically insulators that contain many bound electrons (i.e., the electrons are attached to specific atoms or molecules). Applying an electric field to these charges does not initiate free electron movement. Rather, it displaces the charges from their original positions. This displacement results in a storing of energy, which explains why dielectric materials are often characterized by their ability to store electric energy. The dielectric constant (K; dimensionless) of a material is a property that is proportional to the amount of electrical energy that the material can store. By measuring the capacitance of a capacitor (the capacity of the plates to hold a charge) with a certain dielectric between its plates and comparing this to the capacitance with a vacuum between the plates, one can determine the dielectric constant from the relation $K=C/C_o$, where C (units=Farad) is the capacitance with the dielectric present and $C_o$ is the capacitance with a vacuum as the dielectric. Therefore, insertion of a dielectric reduces the electric field strength between the plates of a capacitor, but it increases the capacitance by a factor of K.

Applying an electric field to a polymer-forming reaction mixture in which the polymer being formed is composed of molecules with a dipole (i.e., a polyurethane) organizes the polymer molecules in a manner such that the reactive ends are on the outside of the molecules and thereby increases the probability of the urethane reaction occurring. The amount of hard segment in the polymer will therefore be increased. Increasing the hard segment content leads to an increase in stiffness/flexural modulus.

However, a system composed entirely of hard segments has very high modulus but no impact strength. To increase the impact strength, it is necessary to produce hard segment domains that are more uniform in size because when there is a distribution of hard segment domain sizes, the smaller domains become localized areas for cracking and crazing, which greatly reduces the overall impact strength of the polymer.

Orienting the urethane dipoles parallel to the electric field during polymerization improves hard segment domain packing, which should in turn improve the heat distortion temperature (HDT) of the polymer. The HDT is related to the hard segment softening point, which is a function of hard segment crystallinity and purity. More regular (crystalline) structures have higher glass transition temperatures ($T_g$) and therefore higher HDTs.

In addition to organizing the hard segments, application of an electric field during polymerization also improves the phase separation of the system. In a phase mixed system, the $T_g$ of the hard segment is lower, which narrows the temperature range over which the polymer is useful. When there is no phase mixing, the hard segment $T_g$ is as high as possible, approaching the melting temperature of the polymer.

Another advantage of the process of the present invention is the elimination of the need for post treatment of the molded parts. Post curing is usually done to relax any internal stresses that form during polymerization. Stresses become frozen in the polymer architecture when the $T_g$ reaches the mold temperature, at which time large scale segmental motion ceases. Post curing is often conducted for 1–24 hours at approximately 10 degrees below the $T_g$ of the polymer to relax internal stresses and increase conversion. It is usually not possible to post cure above the $T_g$, due to the close proximity of the decomposition temperature. Pre-aligning the urethane groups reduces or substantially eliminates these internal stresses in the polymer architecture, thus eliminating the need for post treatment.

The degree of dipole alignment achieved by polymerizing under the influence of a static electric field having an appropriate field strength may be determined through a measurement of the polymer's physical properties, specifically flexural modulus, impact strength, and heat distortion temperature. Dynamic mechanical analysis may also be employed to judge differences in phase separation. Small angle X-ray scattering and atomic force microscopy could also be used to evaluate the effect of a static electric field on polymer structure and properties.

It has been found that by aligning the urethane hard segments in a static electric field, the physical properties of polyurethane formulations such as those used for Resin Transfer Molding (RTM) and cast elastomers are greatly improved. It is therefore possible to simultaneously increase the hard segment content of the polymer while forming domains hat are uniform in size. This leads to an increase in both flexural modulus and impact strength. The alignment in the electric field improves the hard segment domain packing, resulting in an increased heat distortion temperature (HDT). This molding approach overcomes the need for post-treatment of parts after demolding.

Any of the known techniques for determining the amount of energy necessary to rotate the polymer dipoles in an electric field may be used in the practice of the present invention. CAChe®, a computer-aided chemistry software package which is commercially available from Oxford Molecular, Ltd., is particularly useful for calculating the energies necessary to rotate the polymer (e.g., urethane) dipoles in an electric field. In performing such calculation, model polymer groups are chosen from the blend of materials used to produce the polymer (e.g., polyols and isocyanates used in a selected polyurethane-forming formulation), and their lowest energy conformations are calculated using the molecular mechanics algorithm. From these optimized conformations, torsion energies associated with rotation around the urethane linkage are calculated.

A preliminary evaluation of the selected polymer formulation should generally be conducted to establish a baseline for the physical properties of molded articles made without an applied field and to gain an understanding of the sensitivity of the system to changes in processing parameters. In such preliminary evaluation, the mold temperature, reactive component ratio (e.g., isocyanate index), raw material temperature and catalyst level are typically varied, and the effects of each variation on flexural modulus, impact strength, heat distortion temperature and density are measured. In addition, dynamic mechanical analyses should be run on the molded parts to determine the amount of phase separation in the system to be molded. The electrical properties of both the raw materials and finished part are also measured.

After the polymer-forming material has been introduced into the mold, a static electric field generated from a low current power supply may be created by applying a dc voltage from a low current power supply to two conductive mold plates. The polymer-forming reaction mixture should be subjected to this static electric field while the polymer is still being formed, preferably before the exotherm, most preferably within a time of from 90% of the gel time of the polymer up to and including ten times the gel time of the polymer. For safety reasons, the entire apparatus should generally be housed in an electrically insulated container or chamber.

Figure 2:
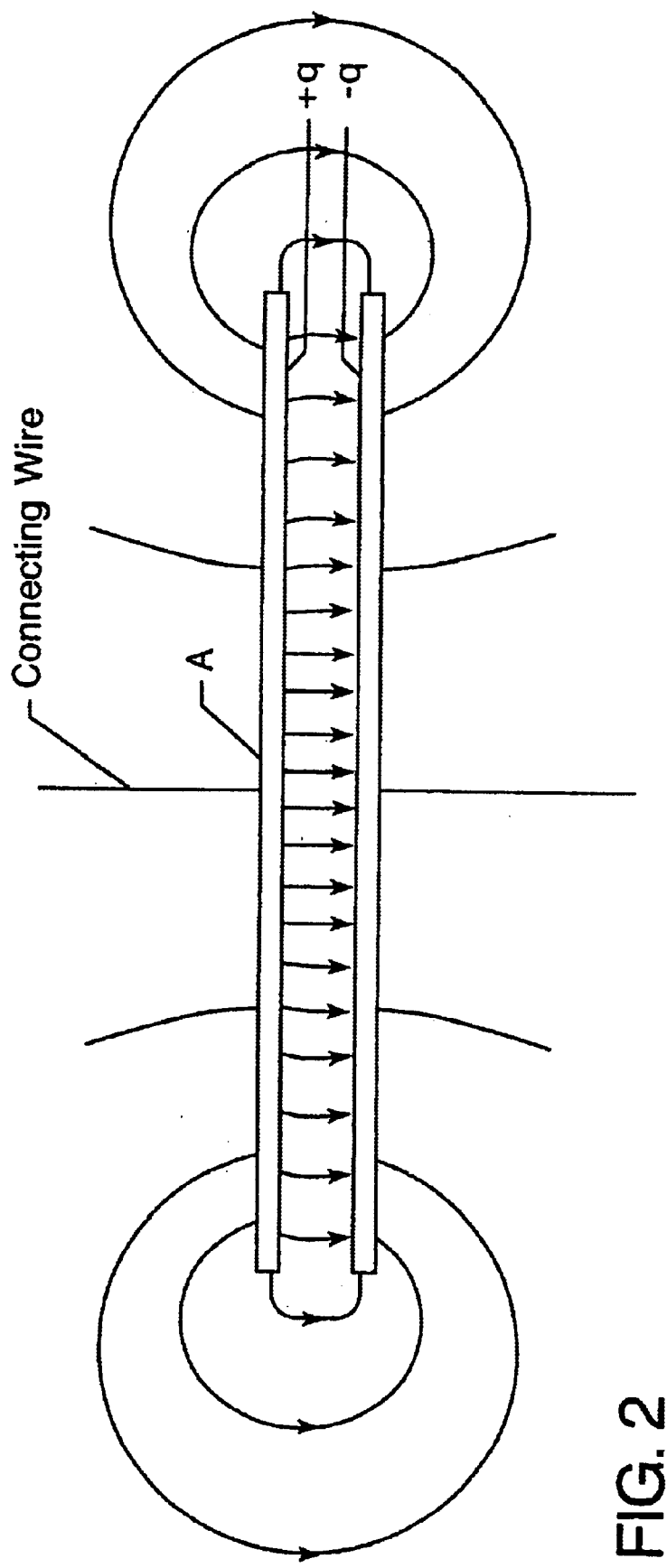
FIG. 2 illustrates a parallel plate capacitor and electric field lines typically found in a parallel plate capacitor.

A static electric field can be generated between the plates of a capacitor, which is a device composed of two insulated conductors carrying equal and opposite charge. FIG. 2 shows a typical parallel plate capacitor in which two conducting plates are separated by a distance with a potential difference between them and the charge is applied to the two plates from a dc voltage source by means of an attached wire. FIG. 2 also shows the electric field lines typically found in a parallel plate capacitor, where the top plate is positively charged and the bottom plate carries a negative charge. The field lines extend from the positive plate and terminate on the negative plate. The field is uniform through the surface of the plates, however fringing occurs around the edges. The electric field strength can be calculated from $E=V/d$, where V is the potential difference (units=volt) and d (units=meter) is the distance between the plates.

Polyurethanes which are suitable for molding in accordance with the present invention are known to those skilled in the art. Polyurethanes having at least 60% by weight (based on total polymer weight), preferably at least 70% by weight, hard segment are particularly useful. Polyurethanes, especially polyurethane elastomers, having such hard segment contents are most preferred. Specific examples of these preferred polyurethane elastomers are disclosed in detail in U.S. Pat. No. 4,792,576 which is incorporated herein by reference.

Materials suitable for the production of polyurethanes having a dipole, molding processes and molding equipment useful in the practice of the present invention are known to those skilled in the art. It may, however, be necessary to modify known molding equipment to prevent arcing. The nature of and manner of making such modifications will, however, be readily apparent to those skilled in the art.

Polyurethane elastomers molded in accordance with the process of the present invention are characterized by more uniform domain size distribution and do not therefore require the post-treatment necessary for polyurethanes molded in accordance with the prior art techniques. The polyurethane elastomers produced in accordance with the present invention typically having flex modulus values greater than 200,000 psi (1378 MPa), preferably greater than 250,000 psi (MPa), most preferably greater than 300,000 psi (2067 MPa). These polyurethane elastomers also generally have impact strengths greater than 3 ft.lbs./in. (160 Joules/m), preferably greater than 5 ft.lbs./in. (267 Joules/m), most preferably greater than 7 ft.lbs./in. (375 Joules/m). Surprisingly, the high flex modulus values are achieved without adverse effect to the impact strength of the elastomer.

The following Examples are given as being illustrative of the present invention.

EXAMPLES

The following materials were used in the polyurethane-forming reaction mixture discussed more fully below.

| | |
|---|---|
| POLYOL A: | A propoxylated propylene glycol having an OH number of 470 and a functionality of approximately 3.4. |
| POLYOL B: | A propoxylated glycerine having an OH number of 1050 and a functionality of approximately 3.0. |
| POLYOL C: | A propylene oxide/ethylene oxide adduct of glycerine having an OH number of 35 and a functionality of approximately 3.0. |
| POLYOL D: | A propoxylated trimethylolpropane having an OH number of 550 and a functionality of approximately 3.0. |
| CATALYST: | A delayed action amine catalyst which is commercially available from Air Products and Chemicals, Inc. under the name Polycat SA-1. |
| ADDITIVE: | An alkali aluminosilicate water scavenger which is commercially available from Bayer AG under the name Baylith L. |
| ISOCYANATE: | A modified diphenylmethane diisocyanate (MDI) having an NCO content of 27.7% and a functionality of approximately 2. |

EXAMPLE 1

27 parts by weight of POLYOL A, 25 parts by weight of POLYOL B, 35 parts by weight of POLYOL C, 13 parts by weight of POLYOL D, 0.30 parts by weight of CATALYST and 3 parts by weight of ADDITIVE were combined and stirred under a nitrogen blanket to form the "B-side" of the reaction mixture. This B-side was then combined with ISOCYANATE at an isocyanate index of 1.05. This system is hereinafter referred to as "TEST SYSTEM". TEST SYSTEM was cast using the Resin Transfer Molding (RTM) technique. RTM is an inexpensive, closed mold process that typically uses low molding pressures to produce mat and preform reinforced composite materials. The processing parameters were as follows:

TABLE 1

| | |
|---|---|
| mold temperature | 65° C. |
| isocyanate index | 1.05 |
| raw material temperature | ambient |
| catalyst level | 0.3 parts |

In order to correctly assess the effects of a static electric field on this polyurethane elastomer system, it was necessary to perform some preliminary background work. This included a computer-aided chemistry study to learn about the energies needed to rotate the urethane dipoles, and a laboratory study to establish a baseline for the physical properties of the system and determine its sensitivity to changes in certain processing parameters. This information is necessary for the design of the electric field mold, specifically to give an idea of the electric field strengths that will need to be contained and to understand the sensitivity of the system, so that the proper amount of control can be incorporated into the mold.

1A. Computer Study

In order to determine the approximate electric field strengths necessary to rotate the urethane dipoles, a study was performed using the computer-aided chemistry software package available from Oxford Molecular, Ltd. under the name CAChe®. Model urethane groups were chosen from the blend of polyols and isocyanates in the above-described formulation. Since there were some similarities between the four polyols in this formulation, it was only necessary to model the reaction of two of the polyols with 4,4'-MDI, the most prevalent isocyanate isomer in this formulation. The urethane groups were optimized to their lowest energy conformations using a molecular mechanics algorithm available in the CAChe® package. From these conformations, potential energy maps were computed to reveal the energy barriers that are encountered upon rotating the urethane dipoles.

Molded panels were made under the processing conditions described above. The flexural modulus, notched izod impact strength, dart impact strength, heat distortion temperature and density of these panels were measured. To determine the sensitivity of TEST SYSTEM to changes in the processing conditions, panels were also made at different levels of each of the processing parameters and subjected to the same property measurements.

Finished parts were subjected to dynamic mechanical analysis (DMA) measurements. These measurements, when compared to the DMAs of parts molded under the influence of a static electric field, make it possible to determine any differences in the amount of phase separation.

Applying electric fields in excess of the dielectric strength of the materials in the mold caused the materials to break down and form a conducting path. To ensure that this does not occur, it is necessary to know the electrical properties of the components in the polyurethane-forming system. The electrical properties of liquid samples of the polyol blend or "B-side" (i.e., POLYOLS A, B, C and D and CATALYST and ADDITIVE), ISOCYANATE and a cured solid polyurethane panel were therefore measured.

Using the computer-aided chemistry software package CAChe®, the energy barriers that are encountered upon polyether rotation around the urethane dipoles in the model groups were calculated. The results are

TABLE 2

| Model Compound | Energy Barrier |
|---|---|
| POLYOL A/MDI | 2 kcal/mole |
| POLYOL B/MDI | 15 kcal/mole |

These low energies indicate that the urethane groups can be influenced by moderate electric fields. It is realized that, in actuality, steric hindrance and hydrogen bonding will play significant roles in aligning the urethane groups. The CAChe® package calculations performed on these two model compounds provided a rough idea of the intra-chain mobility of the molecules and the energy barriers that are associated with rotating the urethane dipoles.

B. Laboratory Study

A laboratory study was conducted with the goal of establishing a baseline for the currently achievable physical properties of TEST SYSTEM. Panels were molded under the conditions of mold temperature, isocyanate index, raw material temperature and catalyst level listed in Table 1 and analyzed. Additionally, a series of panels were cast under different conditions (summarized in Table 3) to see if changes in the processing parameters had a significant effect on the elastomer physical properties. The results of these analyses are summarized in Table 4.

TABLE 3

| FACTORS | LEVELS | | |
|---|---|---|---|
| | Low | standard | High |
| Mold temperature | 55° C. | 65° C. | 75° C. |
| Isocyanate index | 0.90 | 1.05 | 1.15 |
| Raw material temperature | 10° C. | 25° C. | 40° C. |
| Catalyst level | 0.15 parts | 0.3 parts | 0.45 parts |

TABLE 4

| Processing Conditions | Average Flex Modulus (psi) | Average Notched Izod (ft-lbs/in) | Average Dart Impact (ft-lbs) | Average HDT @ 264 psi (C.) | Average Density (lbm/ft3) |
|---|---|---|---|---|---|
| standard | 296000 | 0.71 | 4.9 | 67.5 | 74.04 |
| mold T = 75C | 282200 | 0.67 | 2.4 | 72.4 | 73.74 |
| Mold T = 55C | 370700 | 0.41 | 4.5 | 50.7 | 75.22 |
| iso index = 1.15 | 304000 | 0.61 | 6.2 | 70.3 | 73.86 |
| iso index = 0.90 | 213200 | 0.65 | 5.8 | 53.0 | 73.24 |
| raw mat T = 10C | 263120 | 0.66 | 4.4 | 58.5 | 68.39 |
| raw mat T = 37C | 283500 | 0.73 | 4.7 | 63.0 | 73.02 |
| 2x catalyst | 315920 | 0.59 | 4.3 | 61.5 | 73.05 |
| 0.5x catalyst | 361000 | 0.52 | 2.3 | 55.5 | 72.68 |

To determine the significance of the differences in the physical properties and to see if the physical properties were influenced by a static electric field, the following experiments were conducted using a-mold corresponding to that illustrated in FIGS. 3 and 4.

The mold, shown opened in FIG. 3, used aluminum disks 4 and 5 to carry the charge density when the electric field is applied. These disks 4 and 5 were supported by non-conducting plates 1A and 1B (polycarbonate sheets). The disks 4 and 5 were protected from the reacting polyurethane by a non-conducting film 2 having a dielectric constant higher than that of the polyurethane. A saturated polyester film was used in these experiments. A foam gasket 3 was placed on non-conducting film 2 to form a seal, except at points 6 and 9. Small, non-conducting spacers 8 were used to help maintain the correct thickness of the molded plaque when the mold is closed. FIG. 4 shows the closed mold enclosed in a polycarbonate box 12 for safety reasons. The mold is held closed by several non-conducting clamps 10. A filler tube 11 is attached to the bottom of the mold at point 9 (shown in FIG. 3), the electric field is applied to aluminum disks 4 and 5, the polyurethane-forming reactants are pumped into the mold from the bottom at point 7 (shown in FIG. 3) until the mold is filled.

The temperature was monitored on the inside mold surfaces using adhesively attached thermocouples. The voltage to produce the electric field was obtained from a 50 kV low current dc power supply. When voltage was applied from a cable connected to the top of one of the plates (not shown), a potential difference (and thus a static electric field) was established between the plates. The initial capacitance ($C_o$) of the mold was calculated as follows:

$$C_o = \frac{\varepsilon_o A_{(11)}}{d}$$

where $\varepsilon_o$=permittivity constant=$8.85 * 10^{-12}$ F/m

A=plate area d=plate separation distance

Based on the plate specifications, and assuming a plate separation distance of 3 mm, the initial capacitance $C_o$ was determined to be 251 pF. To calculate the free charge on the plates (Q) when a voltage was applied, the following equation was used:

$$Q = C_o V_o$$

where $V_o$=initial applied voltage

The power supply was capable of supplying voltages from zero to 50 kV. When a charge of 15 kV was applied, the free charge on the plates was 3.75 $\mu$C. This translates into a charge density (by dividing the free charge by the plate area) of 44 $\mu$C/m$^2$.

The electric field strength in the capacitor when there is no dielectric between the plates was calculated as follows:

$$E_o = \frac{Q}{\varepsilon_o A}$$

Based on the previously calculated value for Q, $E_o$ was determined to be approximately 50 kV/cm. When a dielectric was inserted between the plates of the capacitor, the electric field strength (E) decreased according to the equation:

$$E = \frac{E_o}{K}$$

where K is the dielectric constant of the material

The dielectric constants of the materials being used in TEST SYSTEM were previously measured. The cured panel had a dielectric constant of approximately 4, and the polyol and isocyanate raw materials had higher values. As expected, the electric field strength increased as the reaction proceeded when a constant voltage was maintained.

EXAMPLE 2

TEST SYSTEM was reacted in the mold illustrated in FIGS. 3 and 4 at a mold temperature of 65° C. and a stoichiometric ratio of isocyanate to hydroxyl groups of 1.05. Each plate of the mold was separated by an electrical insulator and charged with 10 kV from a static electric field generator. One plate of the mold had +10 kV charge, the other plate had a charge of −10 kV charge and the part thickness was 0.3 cm. The total charge to which the forming polyurethane dipoles were subjected was Q=($q_1$−$q_2$)/d=(10−(−10))/0.3=66.7 kV/cm. The field was applied 10 seconds after completion of filling of the mold and continued for 20 minutes. The molded polyurethane was then removed from the mold.

The molding procedure was repeated using the same materials in the same amounts and the same processing conditions with the exception that no charge was applied to the mold after the mold had been filled.

The properties of the polyurethanes exposed to the charge during molding and the polyurethanes molded without exposure to a charge during the molding process were then determined. The results of these analyses were as follows:

| Physical Property | No charge | 66.7 kV/cm |
|---|---|---|
| Flexural Modulus (psi) | 292,000 ± 5,000 | 335,000 ± 7,000 |
| Un-Notched Izod Impact Strength (ft.-lbs./in.) | 7.9 ± 0.4 | 9.5 ± 0.5 |
| Heat Distortion Temperature (° C. @ 264 psi load) | 76.5 ± 0.4 | 76.6 ± 0.6 |

Although the invention has been described in detail in the foregoing for the purpose of illustration, it is to be understood that such detail is solely for that purpose and that variations can be made therein by those skilled in the art without departing from the spirit and scope of the invention, except as it may be limited by the claims.

What is claimed is:

1. A process for the production of a molded polyurethane comprising
   a) introducing a polyurethane-forming reaction mixture into a mold, and
   b) applying a static electric field having an electric field strength less than that of the polyurethane produced from the reaction mixture but strong enough to align the dipole of the polyurethane being formed to the mold until the reaction mixture has been substantially completely reacted.

2. The process of claim 1 in which the reaction mixture introduced into the mold reacts to form a polyurethane elastomer.

3. The process of claim 1 in which the applied electric field has a field strength less than W/2p where W is equal to the amount of work necessary to rotate the dipole of the polyurethane-forming mixture 180 degrees and p is equal to the dipole moment of the polyurethane-forming mixture.

4. The process of claim 1 in which the molded polymer is molded in a mold having parallel surfaces and static charge is applied to each of these surfaces.

5. The molded polyurethane produced by the process of claim 1.

6. The molded polyurethane of claim 5 having a flex modulus 30 greater than 200,000 psi and a hard segment content of at least 60% by weight.

7. The molded polyurethane produced by the process of claim 2.

* * * * *